US010809895B2

(12) United States Patent
Denoue et al.

(10) Patent No.: US 10,809,895 B2
(45) Date of Patent: Oct. 20, 2020

(54) CAPTURING DOCUMENTS FROM SCREENS FOR ARCHIVAL, SEARCH, ANNOTATION, AND SHARING

(71) Applicant: FUJI XEROX CO., LTD., Tokyo (JP)

(72) Inventors: Laurent Denoue, Veneto (IT); Scott Carter, Mountain View, CA (US); Matthew L. Cooper, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 534 days.

(21) Appl. No.: 15/068,349

(22) Filed: Mar. 11, 2016

(65) Prior Publication Data

US 2017/0262159 A1 Sep. 14, 2017

(51) Int. Cl.

*G06F 3/00* (2006.01)
*G06F 3/0484* (2013.01)
*G06K 9/32* (2006.01)
*G06K 9/00* (2006.01)

(52) U.S. Cl.

CPC ........ *G06F 3/04842* (2013.01); *G06F 3/0484* (2013.01); *G06K 9/00456* (2013.01); *G06K 9/3233* (2013.01); *G06T 2200/24* (2013.01)

(58) Field of Classification Search

CPC .......................... G06F 3/04842; G06F 3/0484

See application file for complete search history.

(56) References Cited

U.S. PATENT DOCUMENTS 6,005,550 A * 12/1999 Vaughan ............ G06F 3/04892 345/157
6,331,860 B1 * 12/2001 Knox .................. H04N 1/3876 345/620
6,675,352 B1 * 1/2004 Osaki .................... A61B 6/468 715/203

(Continued)

FOREIGN PATENT DOCUMENTS

CN 104133683 11/2014
JP 2001142848 A 5/2001

(Continued)

OTHER PUBLICATIONS

TechSmith, Snagit 11, Snagit 11.4 Help, TechSmith Corporation, Version 11.4.0, Jan. 2014, p. 11.*

(Continued)

*Primary Examiner* — Kieu D Vu
*Assistant Examiner* — Andrew Chung
(74) *Attorney, Agent, or Firm* — Procopio, Cory, Hargreaves & Savitch LLP

(57) ABSTRACT

Example implementations described herein are directed to systems and methods for document capture, which can involve detecting, from a plurality of frames of a recording of an application window that comprises a document, document content of the document and screen activity of the application window; and generating a web-based copy of the document based on the document content and the screen activity. Further example implementations can involve recording screen activity such as mouse cursors, text anno- (Continued)

Start

Determine graphical user interface elements 700

Determine region of interest 701

Extract document content from the region of interest and filter out graphical user interface elements 702

Generate images for the web-based copy of the document 703

End tations, scrolling actions and other activity, and then providing an application layer to replay the screen activity onto the captured document.

18 Claims, 11 Drawing Sheets

(56) References Cited

U.S. PATENT DOCUMENTS 7,123,292 B1 * 10/2006 Seeger .................... G03B 5/02 348/218.1
7,640,494 B1 * 12/2009 Chen .................. G06F 17/2247 715/234
8,090,822 B2 * 1/2012 Lee ..................... G06K 9/2072 709/218
2003/0048949 A1 3/2003 Bern et al.
2004/0205623 A1 * 10/2004 Weil ..................... G06F 17/217 715/251
2006/0031764 A1 * 2/2006 Keyser ................. G06F 17/217 715/251
2008/0189648 A1 * 8/2008 Anglin ................. G06F 16/957 715/781
2009/0070670 A1 * 3/2009 Kishi ................. G06F 3/04886 715/702
2011/0126113 A1 * 5/2011 Sharma .............. G06F 16/9577 715/738
2011/0161232 A1 * 6/2011 Brown ................... G06F 21/32 705/71
2011/0161409 A1 * 6/2011 Nair ......................... G06F 8/38 709/203
2012/0036452 A1 * 2/2012 Coleman ................ G06F 21/55 715/751
2012/0304082 A1 11/2012 Patten et al.
2013/0094764 A1 * 4/2013 Campbell ................ G06K 9/32 382/199
2013/0135689 A1 * 5/2013 Shacham ................. H04N 1/38 358/464
2013/0318466 A1 * 11/2013 Estrada ................ G06F 3/0485 715/777
2013/0343612 A1 * 12/2013 Buch ................... G06K 9/3233 382/106
2014/0003712 A1 * 1/2014 Eid ..................... G06K 9/4647 382/164
2014/0033010 A1 * 1/2014 Richardt .............. G06F 17/217 715/222
2014/0055826 A1 * 2/2014 Hinski ................. H04N 1/3876 358/473
2014/0068503 A1 * 3/2014 Yoon .................. G06F 3/04842 715/790
2014/0173484 A1 * 6/2014 Hicks .................... G06F 3/0486 715/769
2014/0223386 A1 * 8/2014 Huang ................ G06F 3/04883 715/863
2014/0327940 A1 * 11/2014 Amtrup ............. H04N 1/00251 358/473
2015/0093018 A1 * 4/2015 Macciola ................. G06T 3/00 382/154
2015/0106769 A1 * 4/2015 Yamazaki ............ G06F 3/0488 715/857
2015/0143210 A1 * 5/2015 Lam ...................... G06F 17/248 715/202
2015/0212981 A1 * 7/2015 Wakefield .............. G06F 16/95 715/274
2015/0269758 A1 * 9/2015 Chan ...................... G06T 11/60 345/629
2015/0346968 A1 * 12/2015 Johnson ................ G01C 21/00 715/771
2016/0027431 A1 * 1/2016 Kurzweil ........... G06F 3/04842 715/203
2016/0117810 A1 * 4/2016 Berry ................. G06F 11/3672 715/738
2017/0104885 A1 * 4/2017 Amtrup ............. H04N 1/19594

FOREIGN PATENT DOCUMENTS

JP 2013027037 A 2/2013
JP 2013161302 A 8/2013

OTHER PUBLICATIONS

Denoue, L., et al., Real-Time Direct Manipulation of Screen-Based Videos, IUI'13, Mar. 19-22, 2013, Santa Monica, CA, 2 pgs.
Marlow, J., et al., Beyond Talking Heads: Multimedia Artifact Creation, Use, and Sharing in Distributed Meetings, CSCW'16, Feb. 27-Mar. 2, 2016, San Francisco, CA, 13 pgs.
Microsoft Research, Image Composite Editor, URL: http://research.microsoft.com/en-us/um/redmond/projects/ice/, 2015 (retrieved Mar. 11, 2016).
Techsmith.com, Snagit (Windows): Scrolling Capture Troubleshooting for Previous Versions, 10 pgs., URL: https://support.techsmith.com/hc/en-us/articles/205881378-Snagit-Windows-Scrolling-Capture-Troubleshooting-for-Previous-Versions, 2015 (retrieved Mar. 11, 2016).
Notice of Reasons for Refusal for related JP App No. 2016-158917 dated Mar. 31, 2020, 5 pgs.

* cited by examiner having access to the user's
a user pick a window to rec
that window, and produces Several important steps ar

- stitching

FIG. 6

CAPTURING DOCUMENTS FROM SCREENS FOR ARCHIVAL, SEARCH, ANNOTATION, AND SHARING

BACKGROUND

Field

The present disclosure is generally directed to document capture, and more specifically, capturing documents from user interfaces or screens.

Related Art

In related art implementations of conducting synchronous collaboration involving documents or video conferencing, one related art method of distributing content involves file repositories or electronic mail. Although related art web-based tools have facilitated on-demand video conferencing, document sharing continues to require coordination upfront, and may therefore not occur in related art implementations.

Sharing documents by email may lead to conflicting versions of content. Additionally, source code shown in a code editor over a video conference may not be easily shared spontaneously. Users may have to take extra steps to upload the code to an online repository or specialized online snippet viewers. Also, when sharing online presentations, for users who wish to show their documents to elicit comments and feedback, such users are often required to screen-share in real-time with their peers and do not have access to the original documents when using the related art implementations.

Furthermore, when one user wishes to present a document in a format that is not widely used by the other peers, the user cannot verify that remote peers will have the necessary software to view the document with related art implementations. Even if the user has software capable of opening the document, the software may not correctly retain source formatting due to being a third party vendor. In still other cases, the presenter may wish to prevent other users from skipping ahead of a presentation so that the presenter is ensured that all of the peers have access to the material equally.

SUMMARY

Aspects of the present disclosure can include a method, which can involve detecting, from a plurality of frames of a recording of an application window having a document, document content of the document and screen activity of the application window; and generating a web-based copy of the document from the document content and the screen activity.

Additional aspects of the present disclosure can include a non-transitory computer readable medium, storing instructions for executing a process. The instructions can include detecting, from a plurality of frames of a recording of an application window comprising a document, document content of the document and screen activity of the application window; and generating a web-based copy of the document from the document content and the screen activity.

Additional aspects of the present disclosure can include an apparatus, which can include a processor configured to detect, from a plurality of frames of a recording of an application window having a document, document content of the document and screen activity of the application window; and generate a web-based copy of the document from the document content and the screen activity.

Aspects of the present disclosure can further include an apparatus, which can involve means for detecting, from a plurality of frames of a recording of an application window having a document, document content of the document and screen activity of the application window; and means for generating a web-based copy of the document from the document content and the screen activity.

BRIEF DESCRIPTION OF DRAWINGS

Exemplary embodiment(s) of the present invention will be described in detail based on the following figures, wherein:

FIG. 6 illustrates an example detection for noise removal, in accordance with an example implementation.

DETAILED DESCRIPTION

Figure 1A:
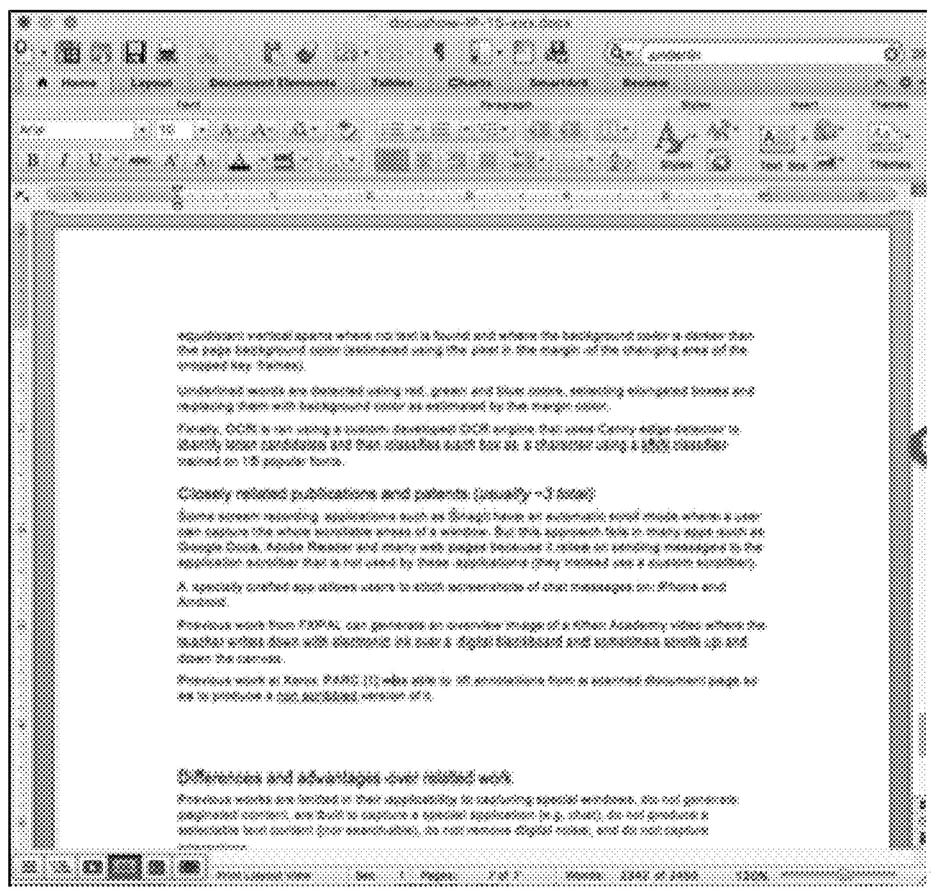
FIGS. 1A and 1B illustrate an example of document capture, in accordance with example implementations.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Example implementations are directed to systems and methods that facilitate the capture of screen content as documents, which may address the document sharing issues of the related art. In an example implementation, a user can invoke a record function, conduct screen activity on a document in any application window, and stop the record function. Using image-processing techniques described below (including stitching), the example implementations automatically generates a web-based copy of the document that can resemble the original document, including searchable text for selection, search and multiple pages.

In example implementations, the image processing techniques identify and remove graphical user interface elements of the document such as underlined misspelled words as they might appear in a word processor, processes screen activity detected in the recording (e.g. mouse actions, text selections, playing a video clip, voice annotation). Finally, the produced documents are provided as a web-based copy with an associated uniform resource locator (URL) that is sharable for others to view, playback, add comments, and so on.

Related art implementations are directed to capturing special windows, do not generate paginated content, are built to capture a special application (e.g. chat), do not produce a selectable or searchable text content, do not remove digital noise, and do not capture interactions. Further, related art implementations require users to operate the system in different ways depending on the application window they wish to capture.

Example implementations are directed to systems and methods of capturing digital content that originate via screen sharing. Example implementations can process capture digital content independent of the underlying content type, while facilitating support for key archiving, searching, annotating, and sharing features. The tool can be implemented as a standalone application or a browser-based application that can recognize a wide variety of content. Example implementations described herein can be applied to both synchronous and asynchronous scenarios.

Example implementations described herein can also be applied for perusing, annotating, and sharing asynchronous content. For example, students watching a recorded lecture who are distributed can use the system to capture content and share notes either together or asynchronously to more effectively interact with each other around the content of interest.

Example implementations may be implemented as a standalone application on a computer or other user device, or can also be implemented within a web browser as a web application that gains access to the windows of the user device through an API. In an example implementation, the application can be configured to prompt the user to pick a window to record, wherein upon a scroll through the content shown in that window, the application produces a new document containing the captured content.

Example implementations can further be packaged as a tool running entirely on the user device, and can also run on a server machine by streaming or uploading the screen recording, for example, using browser-to-browser communication paired with a server-side media gateway that allow live processing or recording plus offline processing.

In example implementations, the content to be captured is embedded in a complex document, such as an online video playing inside a browser window, or an online meeting where the documents are wrapped in a semi three-dimensional plane to represent a blackboard. In these examples, the region of interest can be manually specified and used by the system to capture content.

Figure 1B:
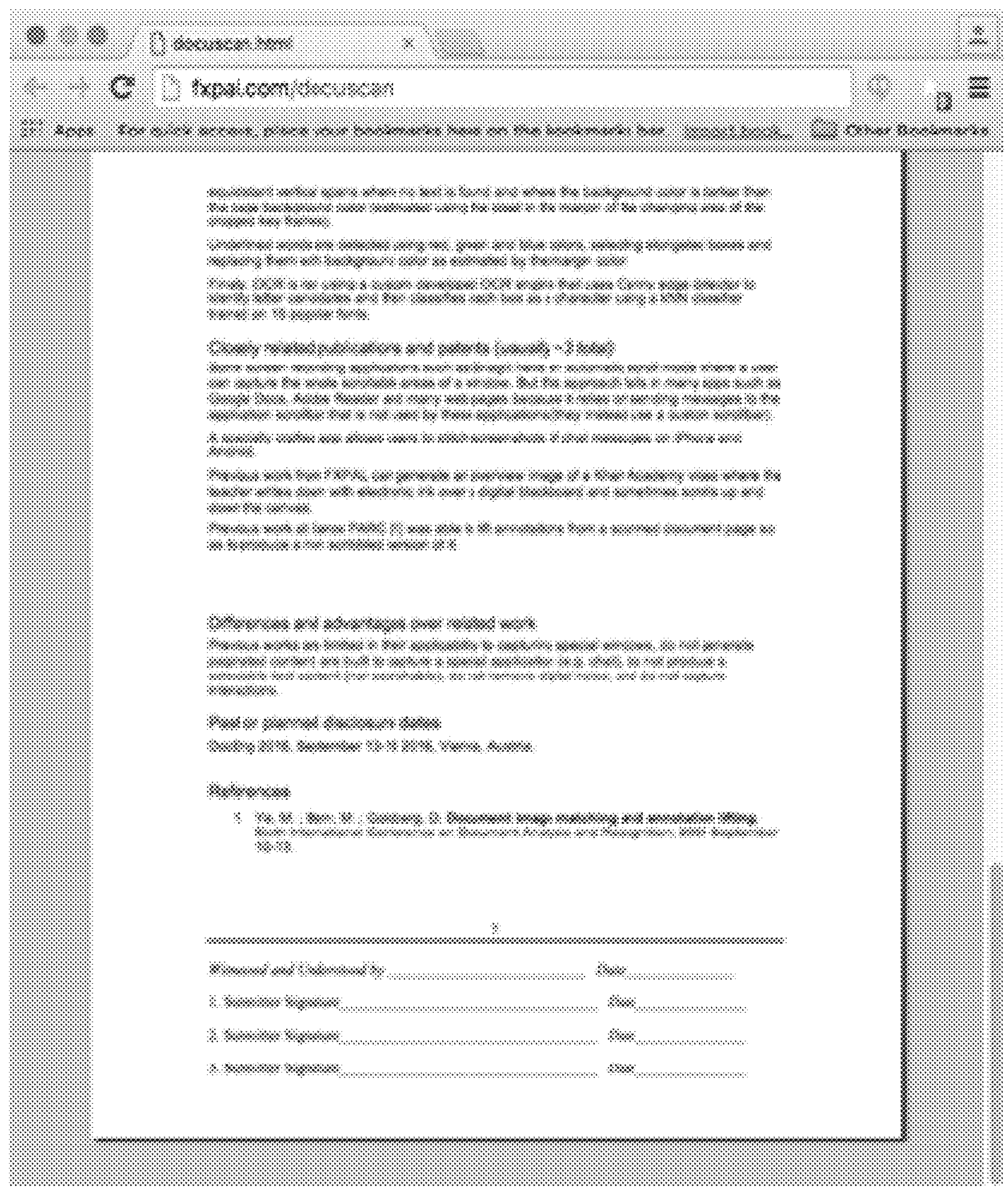

FIGS. 1A and 1B illustrate an example document capture, in accordance with an example implementation. In FIG. 1A, there is an example document that is loaded in a document viewing application. Through the use of example implementations, the document application window is recorded and then screen activity is also recorded. The screen activity in the example of FIG. 1A is a scroll down through the entire document until the end is reached. The recording is then processed by example implementations and then a web-based copy of the document is generated, which can then be accessed through a web browser application as illustrated in FIG. 1B.

Figure 2:
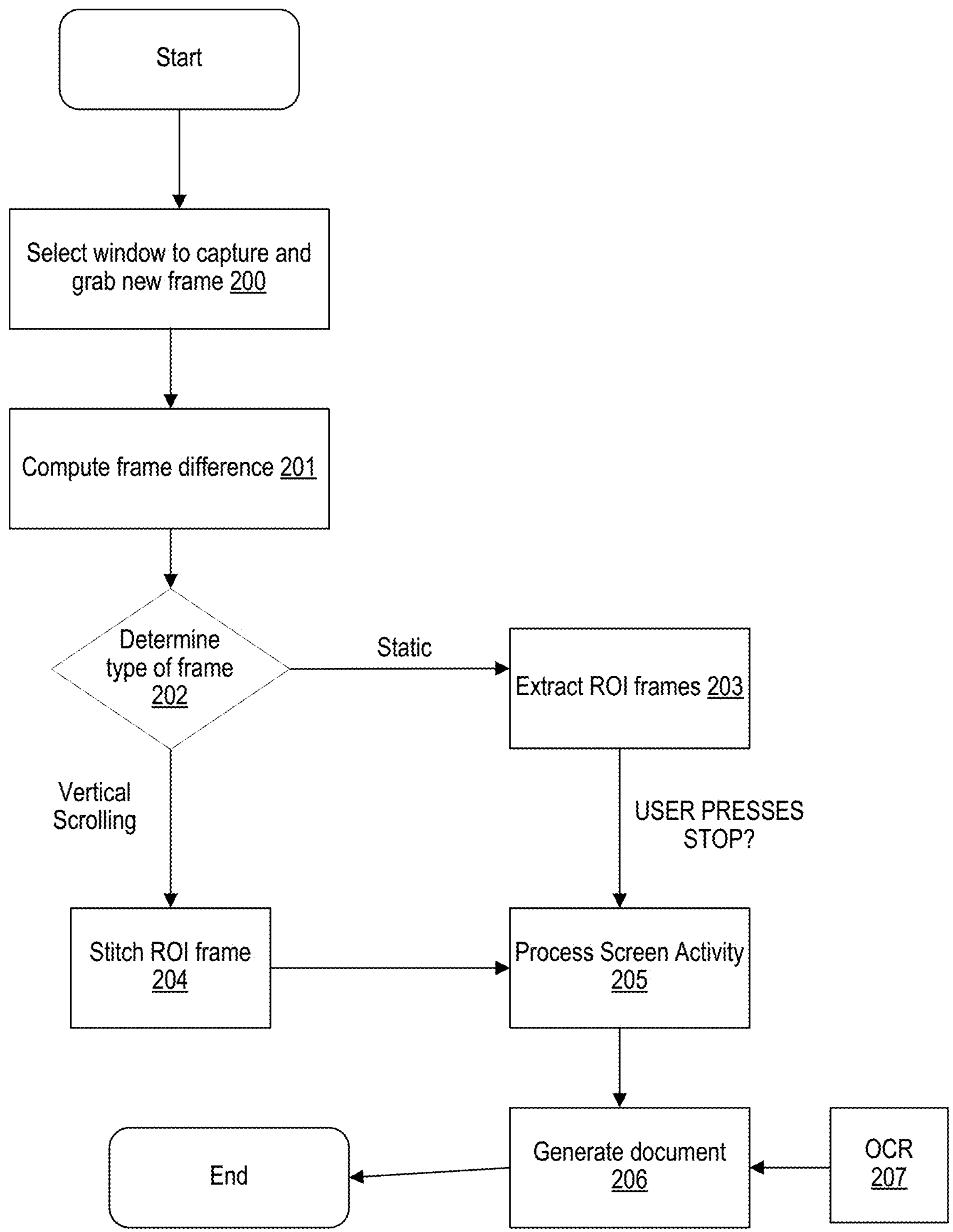
FIG. 2 illustrates an example flow diagram, in accordance with an example implementation.

FIG. 2 illustrates an example flow diagram, in accordance with an example implementation. The flow begins at 200, wherein a selection is made on a target window for document capture and the example implementations grab a new frame. The selection can be conducted through user input, or through detection of the target window based on a desired implementation (e.g. an algorithm that automatically detects presentation windows or video windows). At 201, the frame difference is computed between captured frames to determine changes occurring between the frames (e.g. screen activity, change in the document). The frame difference is conducted by comparing a frame of the captured frames to the subsequent frame of the captured frames, and can be implemented through the use of a difference image or other methods by a processor depending on the desired implementation.

At 202, the type of frame captured is determined based on the calculated frame difference. If the type of frames being captured is static (e.g., no difference between frames, or no difference exceeding a threshold for graphical user interface elements), then the flow proceeds to 203 to capture frames that are within the region of interest. For example, if the screen activity does not exceed a predetermined threshold (e.g., mouse cursor did not move beyond a pixel threshold, scroll bar did not change beyond a pixel threshold, etc.), then the frames can be considered to be static. The methods utilized by example implementations to determine the region of interest are described with respect to FIG. 7A. The region of interest is a region within the captured frames that includes document content or is otherwise directed to the document. Determining the region of interest involves the use of algorithms or other methods to identify the region of interest. The region of interest can be determined based on the content of the frame (e.g. through detection of document corners, through detection of areas having the most change), through a selection made by a user on recorded frames, or by other methods according to the desired implementation and the desired definition of the region of interest for the frames. If the type of frames being captured is determined to involve screen activity such as vertical scrolling or page flipping, then the flow proceeds to 204 to stitch frames that are in the region of interest.

At 205, screen activity is detected for processing as described herein. Screen activity is how the document moves (e.g. scroll or pagination), or in cases when the document does not move, the activity that occurs on the screen. Thus, screen activity involves any activity that occurs on or is associated with captured frames, such as mouse cursor movement, annotations, voices, text selection, playing of video clips, opening of menus on the screen, and so on depending on the desired activity to be identified. Detection of such screen activity involves the use of algorithms or other methods to identify the screen activity. Detection of screen activity can be accomplished by conducting difference images between frames to track activity occurring on the screen, through an application or function that tracks inputs made during the frames (e.g., a keystroke logger, a microphone application, a user activity tracking application), or through any method according to the desired implementation and the desired activity to be captured.

At 206, once the system is instructed to stop tracking the frames (e.g., through user instruction, through the same frame being recorded for more than a predetermined period of time, reaching end of document), the document is then generated as illustrated in FIG. 1B, and additionally, optical character recognition 207 can be applied to the document depending on the desired implementation (e.g., user setting, as directed by user input, on the fly).

Figure 3:
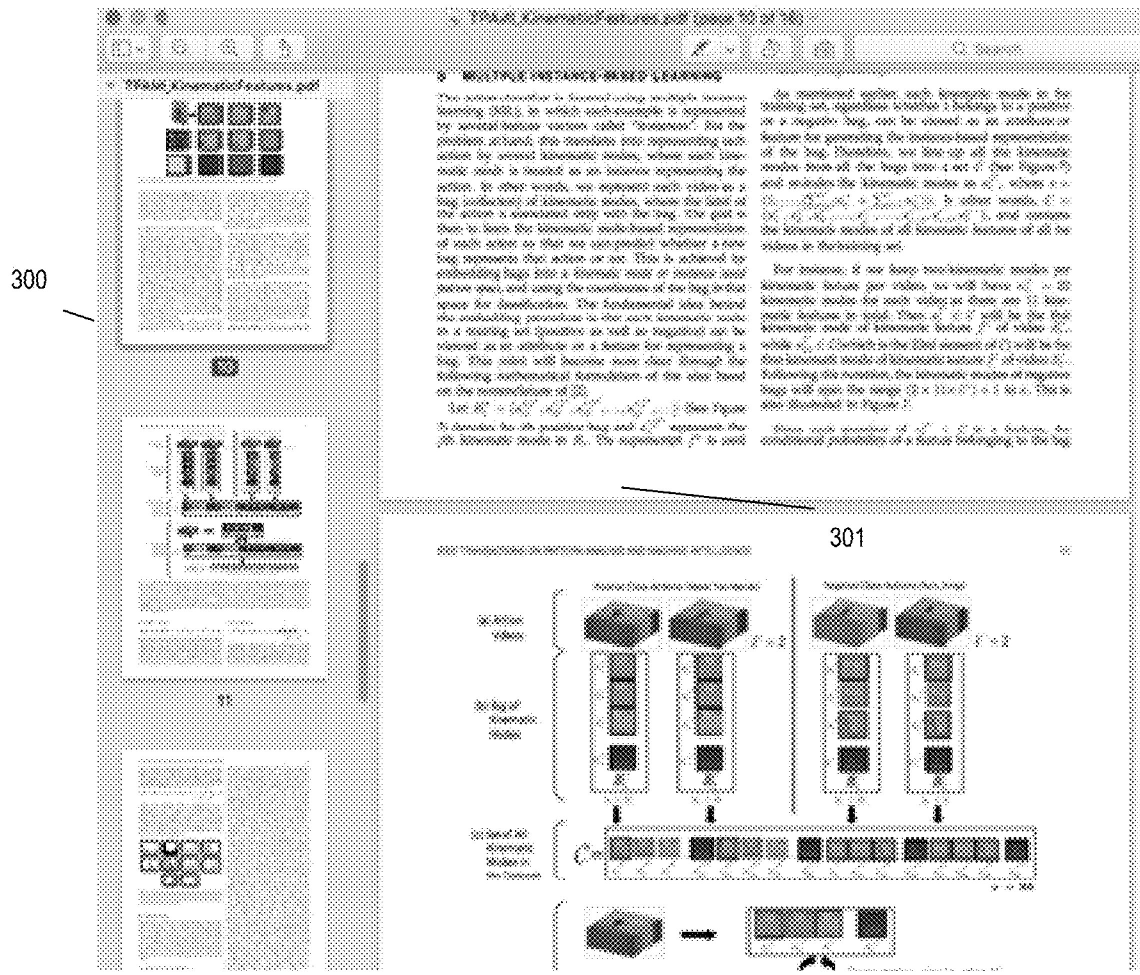
FIG. 3 illustrates an application window, in accordance with an example implementation.

FIG. 3 illustrates an application window, in accordance with an example implementation. Some application windows may be configured to display a series of page thumbnails on the left hand side 300, and to show the main document pages on the right 301. The vertical motion detector can correctly identify the document page area where motion happens consistently, as opposed to episodic changes in other areas of the frame. In such example implementations, the region of interest is detected as the document pages 301, and the graphical user interface elements of the left side 300 can be filtered. Such filters for graphical user interface elements can be generated for each type of document application according to the desired implementation for identifying and filtering graphical user interface elements. For example, in a word processor having graphical user interface elements such as scroll bars, a menu bar and underlining of misspelled words, the filter can be configured to be directed to the word processor and the graphical user interface elements can be filtered with the region of interest focused on the document pages of the word processor.

Figure 4:
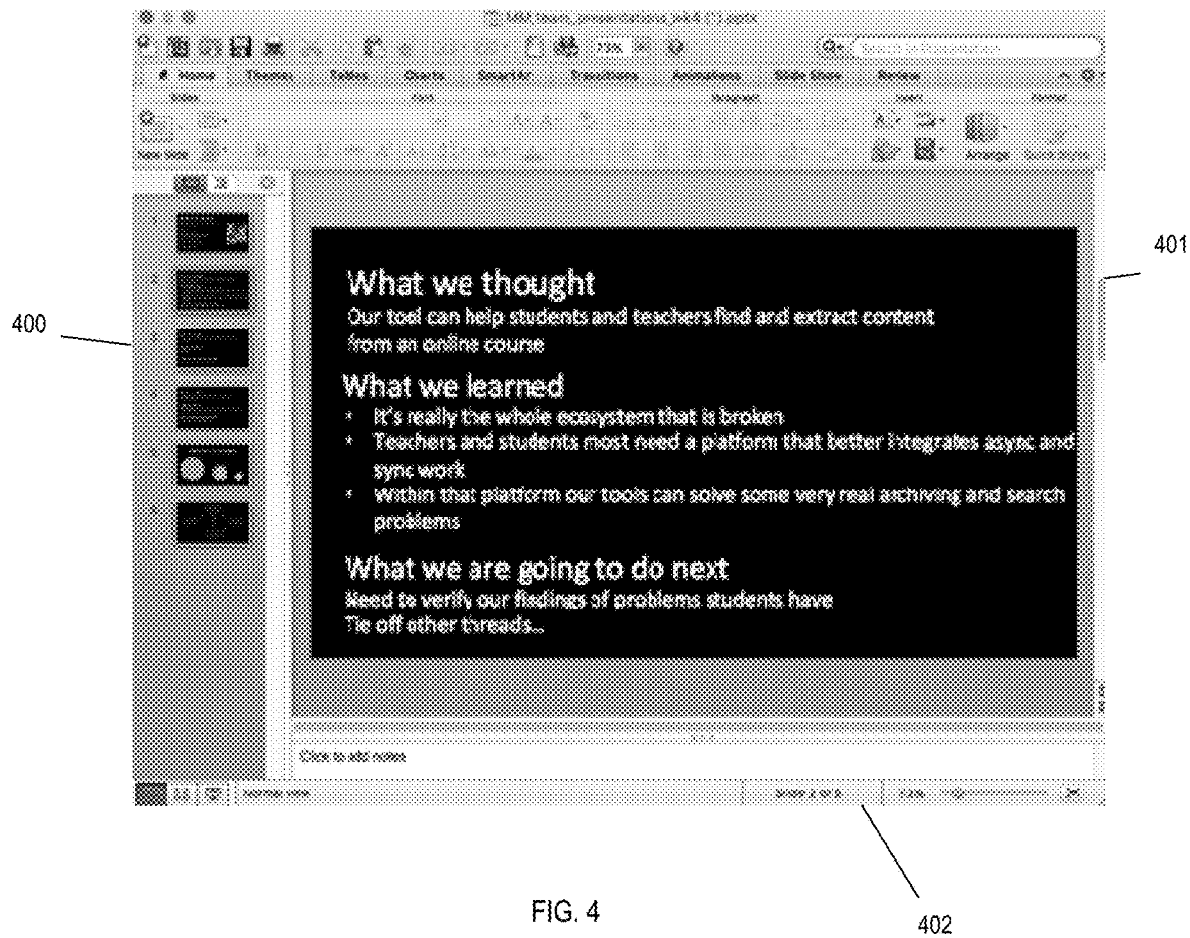
FIG. 4 illustrates an application window, in accordance with an example implementation.

FIG. 4 illustrates an application window, in accordance with an example implementation. Applications for presentation slides can also display slide thumbnails on the side (e.g., left) 400 and the main slide on the other side (e.g., right) 401, with optionally some notes at 402 (e.g., below). Unlike the continuous scrolling detection used to capture document applications and web pages, the example implementations can be configured to use the text bounding boxes to detect new content being shown and to detect the screen activity associated with the paging action (e.g., changing of slides, turning of pages, etc.). Frame difference changes on the graphical user interface elements corresponding to thumbnails being highlighted as well as scroll bar changes on the right can also be used as recorded screen activity, and can be processed to trigger key-frame captures.

Figure 5:
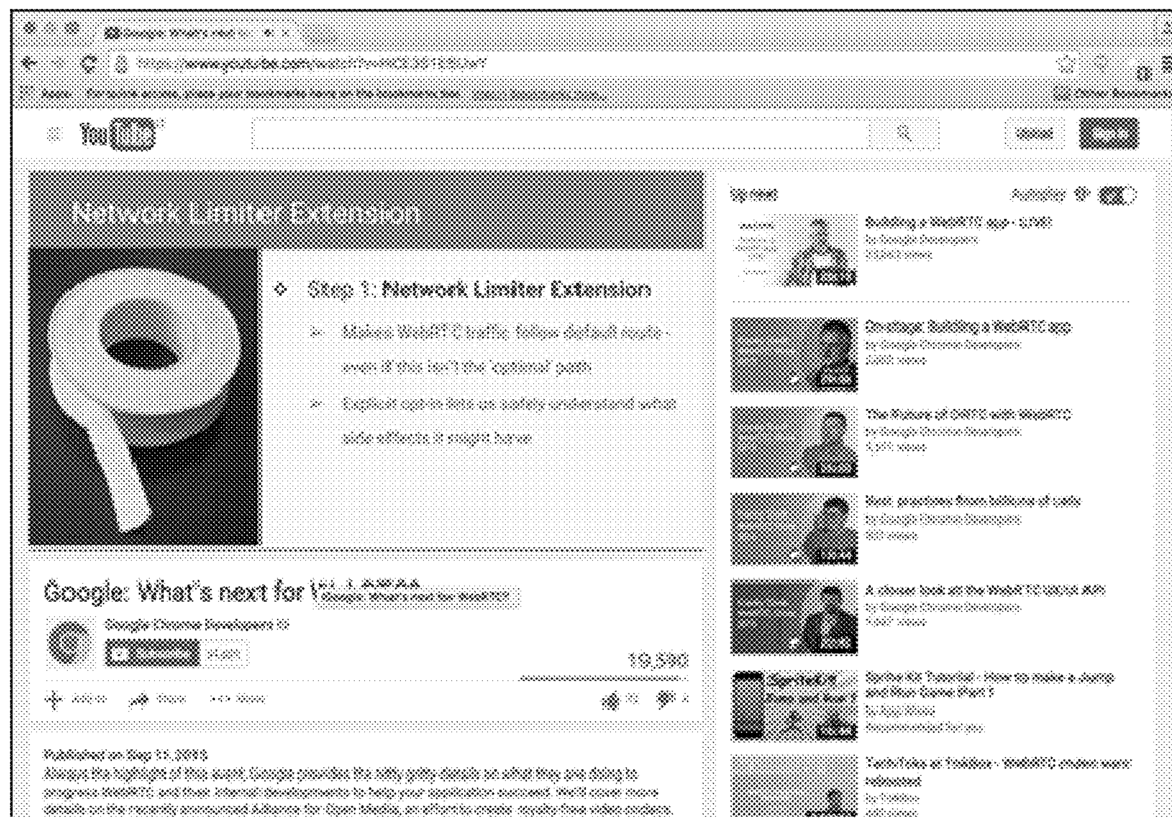
FIG. 5 illustrates an example implementation for online videos.

FIG. 5 illustrates an example implementation for online videos. Online lectures from online videos or presentations captured during a live meeting session may also have a different configuration. The region of interest can also be detected automatically based on the differences between frames in a manner similar to the static presentation case, but without using any scrollbar information as such graphical user interface elements that are typically hidden during playback. Furthermore, the user might scroll the web page hosting the video element, and the region of interest may shift accordingly.

Figure 6:
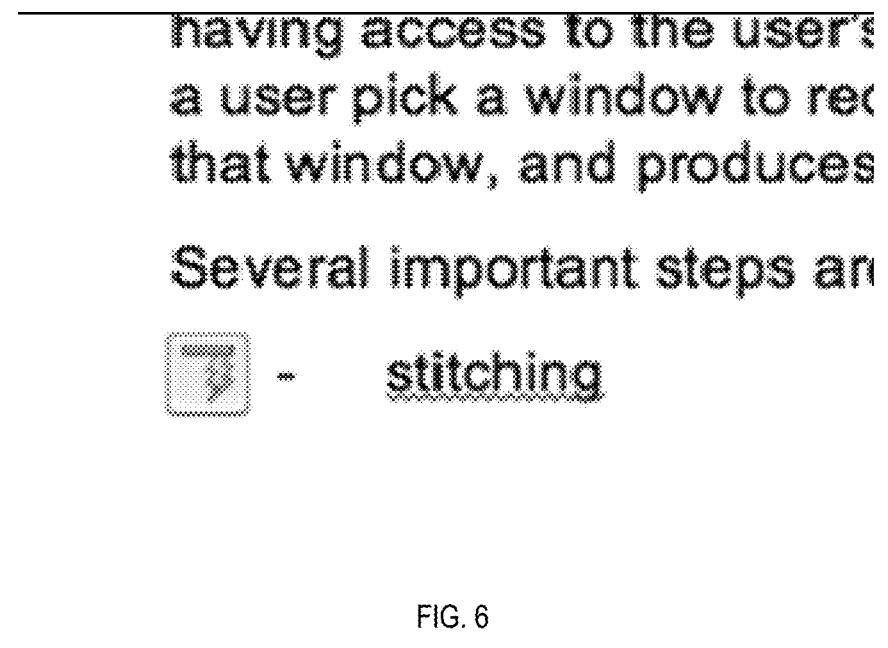

FIG. 6 illustrates an example detection for noise removal, in accordance with an example implementation. In another aspect, noise removal is implemented for document capture to remove noise caused by graphical user interface elements. Not unlike photocopied and scanned images of paper documents, digital documents may include artifacts that can be automatically and semi-automatically removed when producing the document. For example, many word processing applications are configured to underline misspelled words with a unique line (e.g. different color, wavy, etc.), as illustrated in FIG. 6. Such word processing applications may also be configured to have icons appear next to special characters when the document is viewed in editing mode. Additionally, mouse cursor shapes change as the cursor is moved over different words or objects in the document, depending on the desired implementation.

In another aspect, example implementations facilitate the detection of dynamic content. Sometimes digital documents contain playable clips, such as a presentation slide embedding a short video demonstration, or a web page showing an animation. Example implementations can detect and represent these dynamic regions by sets of keyframes, animated images, or reconstituted movie clips. Viewers can replay such clips.

In another example implementation, there is detection of screen activity corresponding to user actions. In an example use case, requests for comments on a particular document are supported, such as a publication or slide deck being co-authored. During a copy operation, the user might point to areas that need comments, represented by mouse or cursor motion, text selections, or audio input such as voice comments. The example implementations extend techniques to separate these actions from the underlying document pages. Similar to dynamic content, audio (e.g., voice) clips can be automatically recorded using a voice activity detector (implemented as software or as a physical processing chip connected to a microphone), and become playable clips in the generated output document. Such output can be generated in a separate application layer that can be overlaid on the web-based copy of the document through the web browsing application, in accordance with the desired implementation. Thus, user activity can be replayed on the document through the application layer.

In another aspect, quality and bandwidth enhancements are implemented in example implementations. For example, a polishing step may be configured to enhance text elements from captured frames to make the text elements sharper, allowing viewers to view the document at a higher fidelity, even if the application window was previously showing the original document in a small area, or if the recording application was capturing the frames at a lower resolution. Furthermore, documents such as presentation slides often contain the same background behind every slide. For compression purposes, the example implementations can reuse this background or some of its components to reproduce the documents and its pages.

In example applications, documents can be reproduced for sharing. Instead of determining the particular ways in which an application can export a document, example implementations can facilitate a user click of a button, scroll or page through the document that was loaded in the application window, and obtain the copy. The copy is immediately sharable as a private or public uniform resource locator (URL), allowing anyone with a web browser to view, add comments, gestures, voice comments over the copy. All interactions made by viewers can further be kept on a server device and sent to the sharer. The analytics data can include what pages were read, what text was most selected, helping the user understand the usage that was made of the shared document.

In another aspect, example implementations facilitate the copying of a document of another user. During online videoconferences, users may share presentation slides, or show source code editors and other documents. Example implementations can capture content shown in the window of the videoconference application, and the user can end up with a properly formatted document of what was shared during the conference. Unlike the previous scenario, in this case the user is not controlling the scrolling or paging through content, but the example implementation is still able to capture pages and make them available as a paginated document.

Through the example implementations, the note-taking may require fewer operations compared to the related art. For example, users can directly copy and paste document fragments being accumulated during the recording by the example implementations, including copying and pasting text or image sub-clips of document pages (e.g. a diagram)

for inclusion in their own note-taking app. Alternatively, the example implementations support note-taking, like annotations over captured document pages as they are being captured (such as highlighting and scribbling over pages), or text notes in the context of the pages.

In another example implementation in which several users co-author a document, a first user can capture a few pages for which the user needs feedback from other co-authors. Co-authors may view the copy through their own user devices, add their comments and send back the link to the first user. The first user reopens the original document and as the first user scrolls through the document, the example implementations automatically indicates the corresponding pages in the annotated copy, making it easier for her to integrate their suggestions into the document.

In example implementations, if the content captured by the tool is made available as a central server, users capturing the same document (e.g. a webinar) can be linked together purely based on the captured content.

In an example implementation, a live application window of a word processor is captured at a number of frames per second (e.g., 10). Image differences are utilized to detect the area of change to crop out menu areas, scrollbars and other non-document related graphical elements. Image stitching is performed by binarizing each frame, running connected components and matching them by the closest connected component line boxes. Page breaks are detected by finding equidistant vertical spans where no text is found, and where the background color is darker than the page background color (estimated using the pixel in the margin of the changing area of the cropped key frames). A copy of the original document is presented as a web page, with one image per page plus optical character recognition (OCR) text.

Thus, example implementations can be directed to automatically generating a web-based copy of a document shown in any application window based on recording the screen activity of that window, and can be implemented based solely on processing of the captured frames and user actions. Such documents being captured can include scrolling (e.g., a document application) or paging (e.g., a presentation slide deck being flipped). In example implementations, image stitching can be used to reproduce the original document pages present in the original document. In example implementations, the scrolling of the application window being captured can be initiated by the user to capture the document content, or by another user giving a presentation (e.g., in the case of a web conference).

In example implementations, the captured document pages can be made available as the document is being captured, i.e. the user has access to newly captured pages as they are captured, which can be useful in a note-taking scenario where the user does not control the scrolling/paging of the document being captured. Interactions made during the capture over the document are separated from the document pages and can be kept as re-playable layers over the copy, e.g. mouse, text, voice actions made during the capture by the user or the person showing a document in a web-conferencing scenario.

Dynamic content such as video clips are detected by example implementations and kept as mini-clips, which can be used as self-contained elements to be played back on the copy. In example implementations, captured document pages may be enhanced (automatically or semi-automatically by user action) to generate a more visually appealing document, including removing the underline under misspelled words or icons that might appear in the original document frames. Example implementations that have recognized document page images are run through OCR to enable text selection and search.

In example implementations, the copy can be immediately shared with a URL to be viewed with any browser-enabled device, including mobile phones. Further comments and analytics can be collected in example implementations (e.g., marks over document pages, highlights, voice comments, but also implicit mouse trails and text selections that might be useful to the author of the original document). Further, the copy can be encrypted using a password or other well-known encryption operations in order to make the copy only accessible and viewable by authorized parties. Text quality may be further enhanced to make the document zoomable.

Figure 7A:
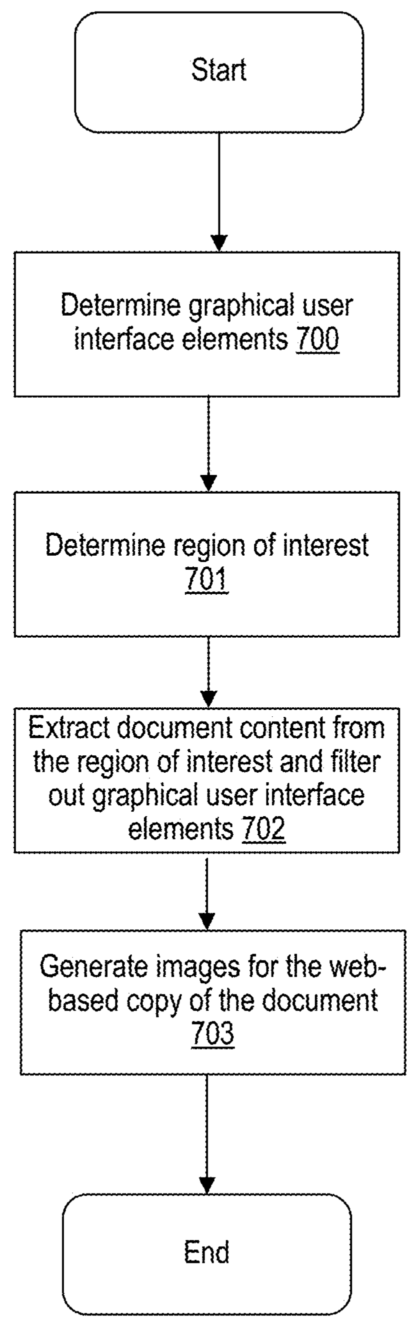
FIG. 7A illustrates a flow diagram for processing document content from the region of interest, in accordance with an example implementation.

FIG. 7A illustrates a flow diagram for processing document content from the region of interest, in accordance with an example implementation. The flow of FIG. 7A can be incorporated during the extraction or stitching of the region of interest frames in the flow of 203 or 204 of FIG. 2. At 700, the graphical user interface elements are determined. The determination can be application dependent and detected according to the desired implementation. For example, a template indicating the location and/or identity of the graphical user interface elements for a document application can be provided to the system, which is then utilized for filtering out the graphical user interface elements.

At 701, the region of interest is determined. The determination can be application dependent and also detected according to the desired implementation. For example, a template indicating the location and identity of the graphical user interface elements for a document application can be provided to the system, which is then utilized for filtering out the graphical user interface elements. Other detection methods can include detecting the corners of a document, detecting the region of interest based on the difference images between frames (e.g. region having most differences across frames is utilized as the region of interest), and so on, depending on the desired implementation. In an example implementation involving the detection of corners, the document corners of known word processing applications can be identified to determine the region of interest. In another example implementation, a heat map can be utilized to track the number of changes occurring at a particular pixel of a frame, and then utilizing the region having the most number of changes as the region of interest. In yet another example implementation, the vertical and horizontal edges obtained by Canny edge detector or similar is used to determine the most likely area of interest to capture.

At 702, the document content from the region of interest is extracted, which can include taking an image of the region of interest from the frame. Graphical user interface elements such as mouse cursors, application specific additions such as highlighting or underlines may also be filtered at this time. At 703, the document content is stored in the form of images which can be utilized to generate the web-based copy of the document. The images can be stitched together to form the document should the frame difference be indicative of a screen activity of scrolling or a paging action.

Figure 7B:
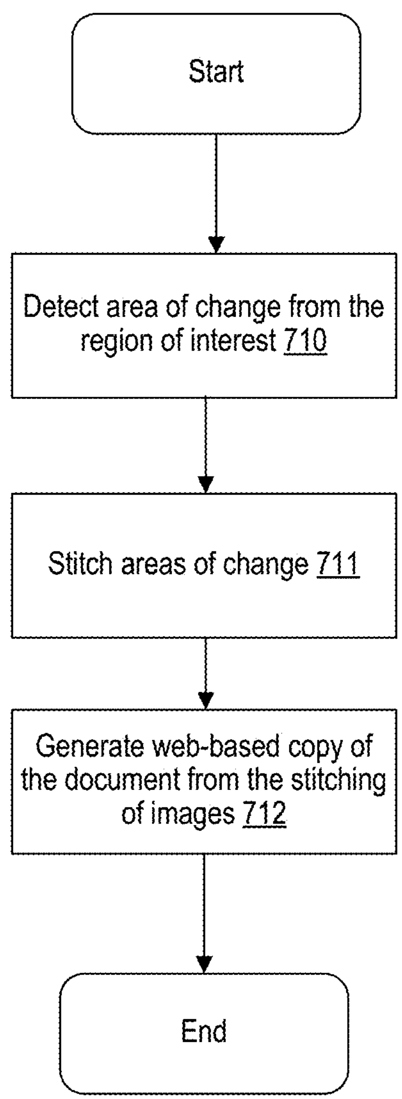
FIG. 7B illustrates a flow diagram for conducting image stitching, in accordance with an example implementation.

FIG. 7B illustrates a flow diagram for conducting image stitching, in accordance with an example implementation. In example implementations, there are several aspects to producing a document. As described herein, there is intelligent stitching and region of interest (ROI) detection. In example implementations, two main categories of document are copied; documents that are scrolled continuously (e.g. document editing or reading software, web pages), and documents that have pages provided sequentially (e.g. presentation decks or slideshows) as indicated in the flow at 204 of FIG. 2.

To detect such changes, example implementations involve vertical motion detection to determine the main area of change at 710. The vertical motion detection can be implemented by any method according to the desired implementation. In an example implementation of vertical motion detection, key points can be extracted from each frame and a binary vector can be computed to describe the surrounding pixels around each key point. The vectors can then be matched between frames to determine the vertical differential through any desired implementation. In an example implementation, a voting function can be used to determine differentials between frames that have the most pairs of matched key points agree upon. Once the detection of vertical motion has been established, frames are cropped to the area that was changed and stitched at 711. The areas of change can be stitched together through the use of pixel matching or bounding boxes, or other methods depending on the desired implementation.

In an example implementation involving bounding boxes, when the captured region moves across the screen of the application window the underlying anti-aliasing process can alter the rendered pixels, while the bounding boxes are similar enough to be matched. By determining the region of interest, the system can thereby detect and remove graphical user interface elements automatically (such as scrollbars, option menus, mini-slides, etc.) as described herein. From the stitching of captured areas of change, which can be in the form of images, the web-based copy of the document can be generated through an image composed through the stitching of images together to form a single image at 712.

Through the stitching implementations of FIG. 7B, the system can generate the web-based copy of the document and reproduce document pages of the document from the image stitching. As the images are stitched together, the page breaks between each document page of the original document are also recorded and stitched as part of the document image.

Figure 7C:
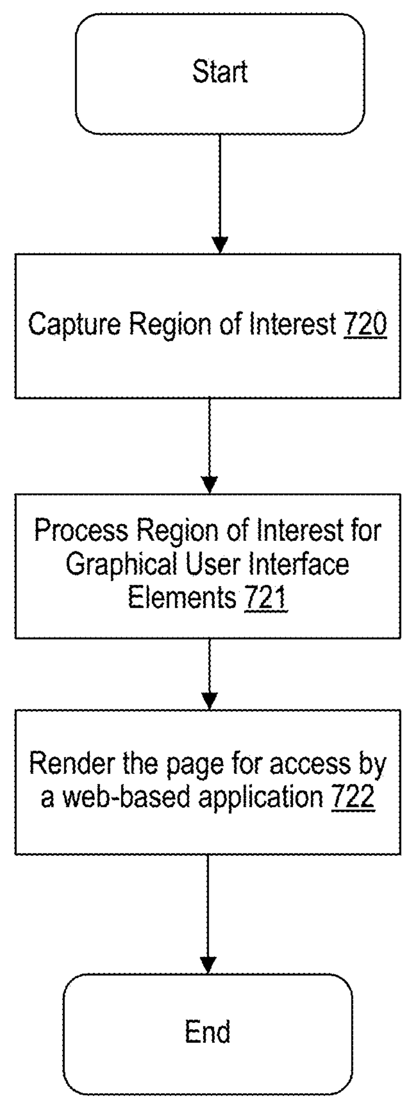
FIG. 7C illustrates a flow diagram for conducting the capture of pages of the document and providing a web-based copy in accordance with an example implementation.

FIG. 7C illustrates a flow diagram for conducting the capture of pages of the document and providing a web-based copy in accordance with an example implementation. In the example of FIG. 7C, the region of interest is captured at 720. When the region of interest is captured, the flow proceeds to 721 wherein the region of interest is processed for graphical user interface elements captured within the region of interest, such as mouse cursors, scroll bars and so on. At 722, the captured region of interest can be rendered as a page for access by a web-based application. Through the flow of FIG. 7C, each of the document pages can be reproduced and rendered to be accessible by a web-based application upon its generation, thereby allowing the capture and provision of the pages of the document as they are displayed. In an example involving a live presentation of slides, each slide can thereby be captured and made available during the presentation.

Figure 8:
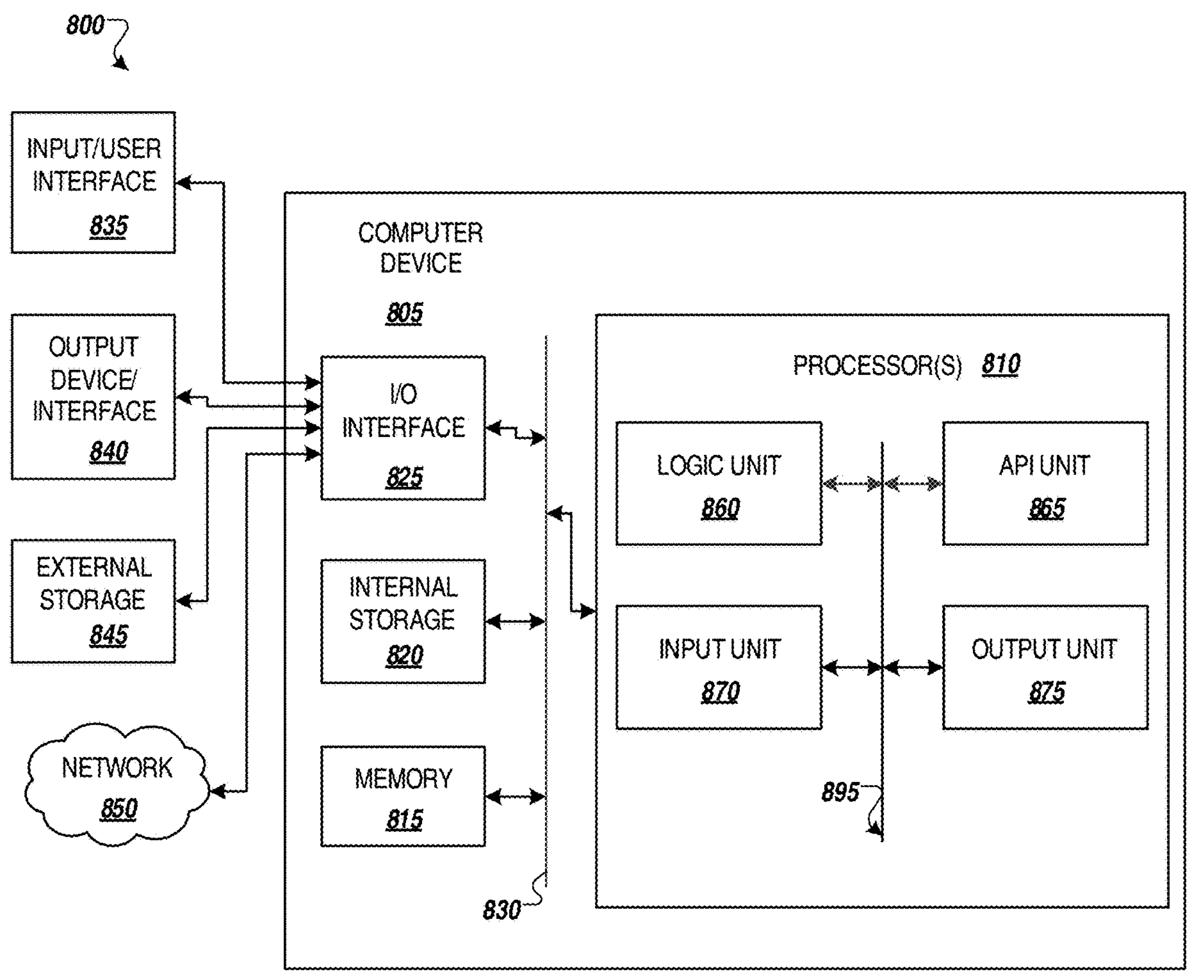
FIG. 8 illustrates an example computing environment upon which the example implementations can be implemented.

FIG. 8 illustrates an example computing environment upon which the example implementations can be implemented. Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computer device 805.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via I/O interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide output based on the calculations described in example implementations.

Processor(s) 810 can be configured to detect, from a plurality of frames of a recording of an application window that includes a document, document content of the document and screen activity of the application window and generate a web-based copy of the document from the document content and the screen activity as described in FIG. 2 and FIGS. 7A to 7C. Processor(s) can be configured to detect the document content of the document and the screen activity of the application window through a determination of a region of interest from the plurality of frames and an extraction of document content from the region of interest as disclosed in FIG. 2 and FIGS. 7A to 7C. Screen activity can include at least one of a scrolling action and a paging action of the document, which processor(s) can utilize to apply image stitching to the region of interest for ones of the plurality of frames associated with the screen activity and generate the web-based copy of the document through a reproduction of document pages of the document from the image stitching as illustrated in FIG. 1B and as described in FIG. 2.

Processor(s) 810 can further be configured to extract the document content from the region of interest through a filtering one or more graphical user interface elements from the region of interest as described in FIG. 7, and can be configured to generate the web-based copy of the document through a reproduction of document pages of the document and a rendering of each of the reproduced document pages to be accessible by a web-based application upon generation of the each of the reproduced document pages as described in FIG. 2 and FIGS. 7A to 7C.

Processor(s) 810 can also be configured to record the screen activity from the plurality of frames; and generate an application layer configured to replay the screen activity on the web-based copy of the document as described in FIG. 2.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:

receiving a plurality of frames of a recording of an application window that comprises a document generated by a document editing software application, the recording comprising the document having:

a plurality of pages separated by one or more page breaks, the plurality of pages including document content, one or more graphical user interface elements of the document editing software, and screen activity within the application window of the document editing software application;

determining frame differences between each of the plurality of frames based by comparing each frame of the plurality of frames to a subsequent frame of the plurality of frames;

detecting, from the plurality of frames the document content, the plurality of pages, the one or more graphical user interface elements, and the screen activity based on the frame differences, the detecting of the plurality of pages comprising detecting the one or more page breaks in the document based on the screen activity;

filtering out the one or more graphical user interface elements of the document editing software from each of the plurality of frames based on one or more of a template for the document editing software indicative of a location and identity of the one or more graphical user interface elements and detection of corners of the reproduced plurality of pages;

extracting the detected document content and detected the plurality of pages from the plurality of frames based on the filtering; and generating a web-based paginated copy of the document, the generating the web-based paginated copy comprising reproducing the extracted document content and the plurality of pages separated by the detected one or more page breaks.

2. The method of claim 1, wherein the detecting the document content of the document and the screen activity of the application window comprises:

extracting the document content from a region of interest determined from either the plurality of frames or from a user selection.

3. The method of claim 2, wherein the screen activity comprises at least one of a scrolling action and a paging action associated with the document, and wherein the method further comprises:

generating the web-based paginated copy of the document through reproducing the extracted plurality of pages from the paging action and an application of image stitching to the region of interest for ones of the plurality of frames associated with the screen activity.

4. The method of claim 2, wherein the extracting the document content from the region of interest comprises filtering one or more graphical user interface elements from the region of interest.

5. The method of claim 1, wherein the generating the web-based paginated copy of the document comprises rendering each of the reproduced plurality of pages to be accessible by a web-based application upon generation of the each of the reproduced plurality of pages based on the detected one or more page breaks from the screen activity.

6. The method of claim 1, further comprising:

recording the screen activity from the plurality of frames; and generating an application layer configured to replay the screen activity on the web-based paginated copy of the document.

7. A non-transitory computer readable medium, storing instructions for executing a process, the instructions comprising:

receiving a plurality of frames of a recording of an application window that comprises a document generated by a document editing software application, the recording comprising the document having:

a plurality of pages separated by one or more page breaks, the plurality of pages including document content, one or more graphical user interface elements of the document editing software, and screen activity within the application window of the document editing software application;

determining frame differences between each of the plurality of frames based by comparing each frame of the plurality of frames to a subsequent frame of the plurality of frames;

detecting, from the plurality of frames the document content, the plurality of pages, the one or more graphical user interface elements, and the screen activity based on the frame differences, the detecting of the plurality of pages comprising detecting the one or more page breaks in the document based on the screen activity;

filtering out the one or more graphical user interface elements of the document editing software from each of the plurality of frames based on one or more of a template for the document editing software indicative of a location and identity of the one or more graphical user interface elements and detection of corners of the reproduced plurality of pages;

extracting the detected document content and the detected plurality of pages from the plurality of frames based on the filtering; and generating a web-based paginated copy of the document, the generating the web-based paginated copy comprising reproducing the extracted document content and the plurality of pages separated by the detected one or more page breaks.

8. The non-transitory computer readable medium of claim 7, wherein the detecting the document content of the document and the screen activity of the application window comprises:

extracting the document content from a region of interest determined from the plurality of frames.

9. The non-transitory computer readable medium of claim 8, wherein the screen activity comprises at least one of a scrolling action and a paging action associated with the document, and wherein the instructions further comprise:

generating the web-based paginated copy of the document through reproducing the extracted plurality of pages from the paging action and an application of image stitching to the region of interest for ones of the plurality of frames associated with the screen activity.

10. The non-transitory computer readable medium of claim 8, wherein the extracting the document content from the region of interest comprises filtering one or more graphical user interface elements from the region of interest.

11. The non-transitory computer readable medium of claim 7, wherein the generating the web-based paginated copy of the document comprises rendering each of the reproduced plurality of pages to be accessible by a web-based application upon generation of the each of the reproduced plurality of pages based on the detected one or more page breaks from the screen activity.

12. The non-transitory computer readable medium of claim 7, further comprising:

recording the screen activity from the plurality of frames; and generating an application layer configured to replay the screen activity on the web-based paginated copy of the document.

13. An apparatus, comprising:

a processor, configured to:

receive a plurality of frames of a recording of an application window that comprises a document generated by a document editing software application, the recording comprising the document having:

a plurality of pages separated by one or more page breaks, the plurality of pages including document content, one or more graphical user interface elements of the document editing software, and screen activity within the application window of the document editing software application;

determine frame differences between each of the plurality of frames based by comparing each frame of the plurality of frames to a subsequent frame of the plurality of frames;

detect, from the plurality of frames the document content, the plurality of pages, the one or more graphical user interface elements, and the screen activity based on the frame differences, the detecting of the plurality of pages comprising detecting the one or more page breaks in the document based on the screen activity;

filter out the one or more graphical user interface elements of the document editing software from each of the plurality of frames based on one or more of a template for the document editing software indicative of a location and identity of the one or more graphical user interface elements and detection of corners of the reproduced plurality of pages;

extract the detected document content and the detected plurality of pages from the plurality of frames based on the filtering; and generate a web-based paginated copy of the document, by reproducing the extracted document content and the plurality of pages separated by the detected one or more page breaks.

14. The apparatus of claim 13, wherein the processor is configured to detect the document content of the document and the screen activity of the application window through an extraction of the document content from a region of interest determined from the plurality of frames.

15. The apparatus of claim 14, wherein the screen activity comprises at least one of a scrolling action and a paging action associated with the document, and wherein the processor is configured to:

generate the web-based paginated copy of the document through reproducing the extracted plurality of pages from the paging action and an application of image stitching to the region of interest for ones of the plurality of frames associated with the screen activity.

16. The apparatus of claim 14, wherein the processor is configured to extract the document content from the region of interest through a filtering one or more graphical user interface elements from the region of interest.

17. The apparatus of claim 13, wherein the processor is configured to generate the web-based paginated copy of the document through a rendering of each of the reproduced plurality of pages to be accessible by a web-based application upon generation of the each of the reproduced plurality of pages based on the detected one or more page breaks from the screen activity.

18. The apparatus of claim 13, wherein the processor is configured to:

record the screen activity from the plurality of frames; and generate an application layer configured to replay the screen activity on the web-based paginated copy of the document.

* * * * *